Nov. 7, 1967 H. C. A. VAN DUUREN 3,351,906

READING-DEVICE FOR AN INFORMATION BEARER

Filed Sept. 26, 1962 2 Sheets-Sheet 1

INVENTOR.
H. C. A. VAN DUUREN

BY

ATTORNEY

READING-DEVICE FOR AN INFORMATION BEARER

Filed Sept. 26, 1962 2 Sheets-Sheet 2

INVENTOR.
H. C. A. VAN DUUREN
BY Hugh A. Kirk
ATTORNEY 3,351,906
Patented Nov. 7, 1967

3,351,906

READING-DEVICE FOR AN INFORMATION BEARER

Hendrik Cornelis Anthony van Duuren, Wassenaar, Netherlands, assignor to De Staat der Nederlanden, ten deze vertegenwoordigd door de Directeur-Generaal der Posterijen, Telegrafie en Telefonie, The Hague, Netherlands Filed Sept. 26, 1962, Ser. No. 226,357
Claims priority, application Netherlands, Oct. 2, 1961, 269,829
6 Claims. (Cl. 340—146.3)

The invention relates to a reading-device for an information bearer provided with rows of characters having code elements arranged in columns, in which the information bearer moves with respect to the scanners in the direction of said rows and each code element is scanned by at least three scanners simultaneously, and in case different scanning-results are obtained, the result given by the majority of the scanners is accepted.

Such a reading-device is known from the British Patent No. 820,283 and is used for characters in which occurs one code element per column to guarantee a correct scanning-result in the case of a locally poor impression of the character or in the case of a faulty working scanner. If this reading-device were used for signals containing more than one code element in a column, there is a possibility that code elements are read wrong, i.e. that a scanning result is wrongly accepted, even if the character would be shifted with respect to the scanners by only once the distance between the scanners, combined with one of the said faults.

The object of this invention is to provide with practical certainty, that whenever such characters of code elements are scanned, the acceptance of the scanning-results occurs correctly, whereas the number of rejected scanning-results is reduced to an acceptable minimum. According to the invention this is achieved by scanning each of two or more elements in at least one column of elements which make up at least a part of each character, and by scanning each of said plurality of elements by at least three scanners located side by side, and accepting the scanning results for a character only if the majority of the scanners for each code element making up the whole character gives the same results from correspondingly located adjacent scanners of the elements.

It is observed that according to the copending U.S. patent application of Van Berkel assigned to the present assignee Ser. No. 72,666 filed Nov. 30, 1960, each code element of such a signal is also scanned by more than one scanner. In this case, however, the acceptance or rejection of the scanning-results occurs by verifying for each character, whether they do or do not fit in the self-checking code used.

According to this invention no requirements need to be set to the code.

The above mentioned and other features and objects of this invention and the manner of attaining them will become more apparent and the invention itself will be understood best by reference to the following description of an embodiment of the invention taken in conjunction with the accompanying drawings, wherein.

Figure 1:
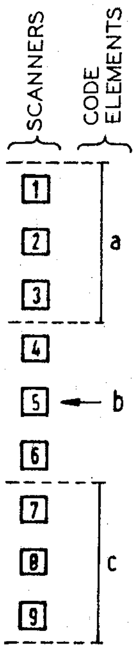
FIG. 1 is a schematic diagram of a column containing three code elements and nine scanners at the correct height.

FIG. 1 shows a vertical column containing the pieces *a* and *c* of a line with an open space *b* between them. These pieces *a* and *c* and the space *b* may form part of a character as code elements. The code elements are of equal size and are aligned in vertical columns. It is to be examined whether a piece of line is present or not at each of the spots *a*, *b* and *c*. This can be done by means of scanners represented by squares 1 through 9 in FIG. 1, each of which contains a photocell.

Of course there are other possibilities too. If e.g. the code elements are stored in a magnetic tape, use will be made of the associated reading-heads in squares 1 through 9. In all these cases, if one scanner is used for each code element, it may happen that an irregularity occurs at the very scanning-place, or that one of the only three scanners is out of order.

Then as a check, one might resort to the use of two scanners for each code element, and only accept the scanning-result if it is delivered by both of the scanners. Under such conditions, only a slight irregularity would not lead to the acceptance of an erroneous scanning result. If, however, there occurs a shift in a vertical direction, so that the code elements pass the scanners so high that the scanning-result of the lower one of each of the two scanners becomes uncertain, then the whole scanning result becomes uncertain.

Figure 2:
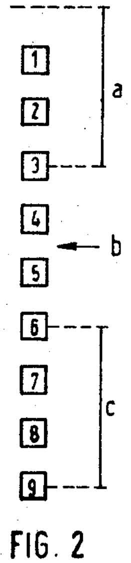
FIG. 2 is a schematic diagram of the same column of three coded element, but with the scanners shifted with respect the said elements.

That is why in FIG. 1 three scanners have been provided for each code element, viz. 1–3, 4–6 and 7–9, respectively. If the scanning-result of the lower of each three scanners is uncertain due to a shift as shown in FIG. 2, the two remaining scanners for that element still insure a correct scanning; that is if the majority of the scanning-results is accepted, it is a correct scanning. Should the case present itself, however, that there is an irregularity at scanner 1, a wrong scanning-scanning—results was taken without any further restriction. Such an acceptance of erroneous scanning—results can be properly prevented by only accepting the majority result from two adjacent scanners out of the three adjacent scanners for each element. In the case of an isolated piece of line, a better guarantee against the acceptance of a wrong-scanning-result is obtained, even if a small shift between the code elements and the scanner occurs. An increase of the number of scanners would only make the reading-device more voluminous. Of course a practically absolute guarantee can be obtained by only accepting results obtained from all the scanners of a code element, but in that case a practically inadmissible number of scanning results would have to be unnecessarily rejected.

If however, there is more than one code element in each column, the guarantee can be increased considerably, without too many unnecessary rejections occurring, by only accepting the majority result of adjacent scanners, if for each of the different elements in the column it originates from correspondingly located pairs of scanners at each element, since it is deemed highly improbable that irregularities would occur in each element in a column at correspondingly the same relative scanning places. In such a rare situation the qualification of irregularities would no long hold.

Figure 3:
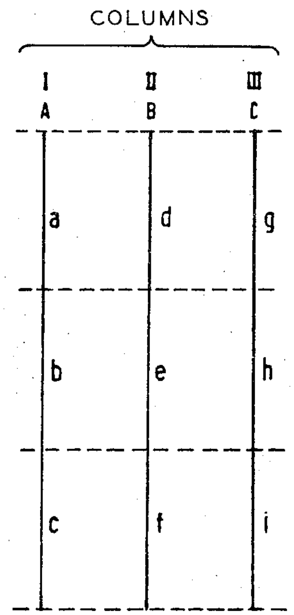
FIG. 3 is a schematic diagram of three columns of code elements, from which characters can be formed.
Figure 4:
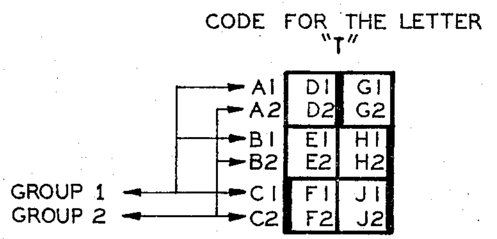
FIG. 4 is a schematic diagram of one example of a character which may occur in the three columns of FIG. 3.

The recognition of characters will require more than three code elements, which will generally be arranged in two or more vertical columns and horizontal rows. For example, FIG. 3 shows the elements *a*, *b* and *c* in column I, the elements *d*, *e* and *f* in column II, and the elements *g*, *h* and *i* in column III; and FIG. 4 shows the elements arranged for the code of the letter "T." If in this case too, the scanning-results are only accepted if they originate for all the elements from correspondingly located adjacent scanners that is, Group 1 or Group 2, the guarantee against the wrong acceptance of an erroneous scanning-result is practically complete, which is especially important, if the code used is not self-checking. Moreover, in practice, the number of rejected results under such conditions has proven to be small.

Figure 5:
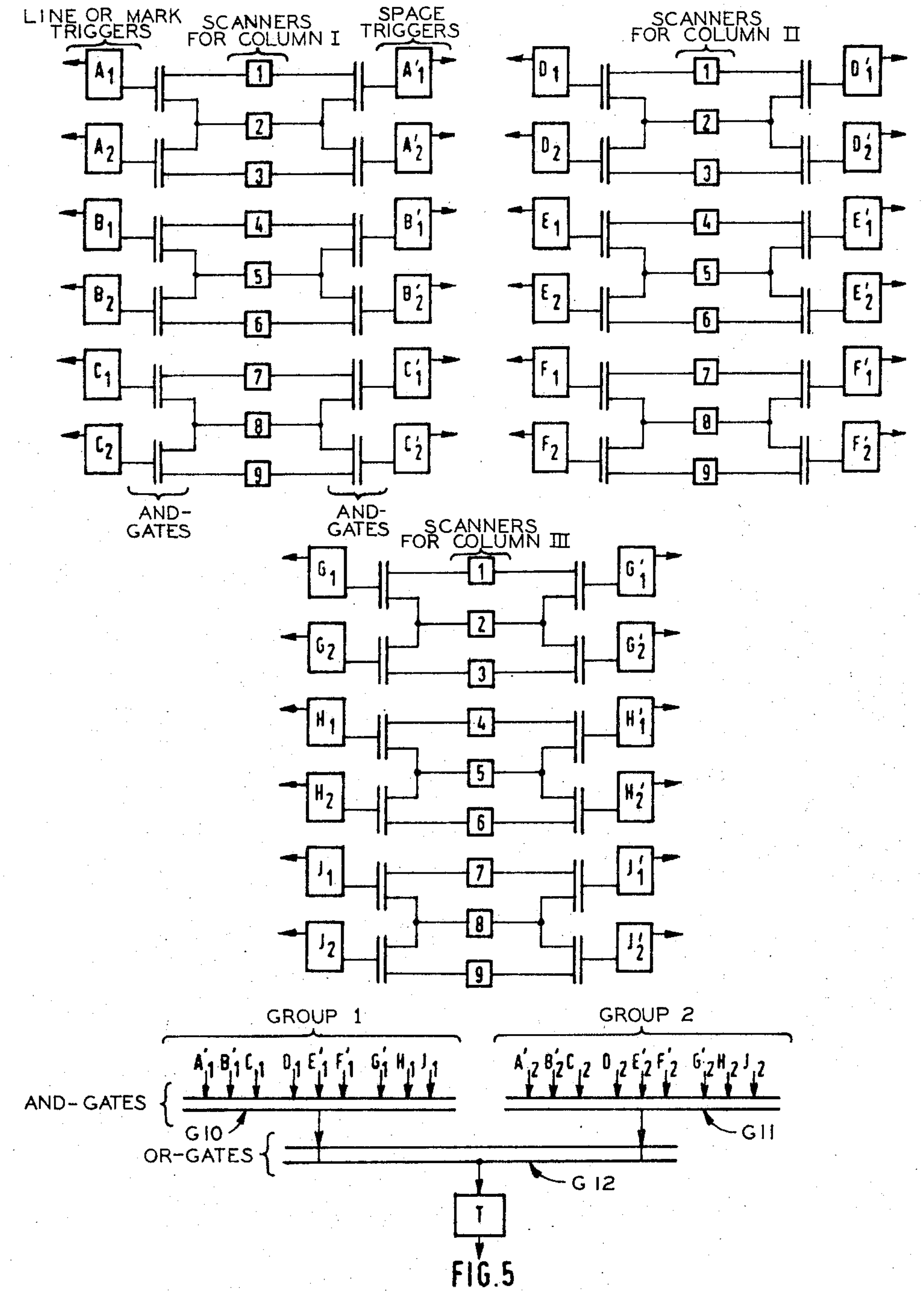
FIG. 5 is a composite block wiring diagram of a reading device which may be employed for reading successive columns of three code elements as shown in FIG. 4.

FIG. 5 is a schematic block wiring diagram of a scanning-device that can be used for this purpose. The nine photocells for the scanning of the left-hand column, together with the amplifiers and triggers directly connected to them are represented by the blocks 1–9. It is assumed that, when a piece of line is detected, the trigger in such a block delivers a positive potential at its left-hand terminal, whereas if there is not a piece of line, but a space, the right-hand output terminal possesses a postive potential. For the detection of the top code element (such as *a* in column I of FIG. 3) the corresponding output terminals of the scanner blocks 1, 2 and 3 are connected to AND-gates or circuits, and the output terminals of these And-gates or circuits are connected to the triggers $A_1$, $A_2$ and $A_1'$, $A_2'$, respectively. In the same way the triggers $B_1$, $B_2$ and $B_1'$, $B_2'$ are associated with the middle code element (such as *b* in column I of FIG. 3), and the triggers $C_1$, $C_2$ and $C_1'$, $C_2'$ are associated with the bottom code element (such as *c* in column I of FIG. 3). Then if the left-hand output terminals of the two blocks connected to the same AND gate or circuit are positive, the relevant trigger is put in the "on"-state.

The samething occurs, if the right-hand output terminals are positive.

The scanning of the middle II and the right-hand III columns in FIGS. 3 or 4 occurs in an analogous way, and the results obtained are recorded in the triggers D, E, F and G, H, J, respectively shown in FIG. 5.

The lower part of FIG. 5 shows which outputs of the triggers A1 through J'2 of the six columns of triggers are energized to the "on" state or produce positive potentials in both Group 1 and Group 2, for the detection of the character "T" represented in FIG. 4. Thus output terminals of the triggers $A_1'$, $B_1'$, $C_1$, $D_1$, $E_1'$, $F_1$, $G_1'$, $H_1$ and $J_1$, all of which are in the "on"-state for their corresponding triggers in Group 1 and have potentials of the same polarity, are connected to an AND-circuit or gate G10 of Group 1 corresponding to this polarity. In the same way output terminals of the triggers $A_2'$, $B_2'$, $C_2$, $D_2$, $E_2'$, $F_2'$, $G_2'$, $H_2$ and $J_2$ are connected to another AND-circuit or gate G11 corresponding to Group 2. The output terminals of these AND-circuits G10 and G11 for Group 1 and Group 2 are connected to an OR-circuit or gate 12, so that, if one of the two AND-circuits G10 and G11, or both of them, receive at all the input terminals potentials of the said polarity, the character "T" is detected by the change-over of the trigger T.

While I have illustrated and described what I regard to be the preferred embodiment of my invention, nevertheless it will be understood that such is merely exemplary and that numerous modifications and rearrangements may be made therein, without departing from the essence of the invention.

I claim:

1. A reading device for characters consisting of code elements arranged in columns, and comprising: for each element:

(a) at least three different scanning means (1–3, 4–6 or 7–9) for simultaneously scanning each element and (b) element responsive means ($A_1$, $A_2$—or J'2) responsive to similar outputs from at least each two adjacent ones of said scanning means, and for each character:

(a) first character responsive means (G10) responsive to similar outputs from all those said elements responsive means which correspond to the same relatively located adjacent ones of said scanning means for each element, for the specific combination of said element responsive means for that character, (a) second character responsive means (G11) responsive to similar outputs from all those said element responsive means which correspond to the same but other relatively located adjacent ones of said scanning means for each element, for the specific combination of said element responsive means for that same character, and (c) means (G12) responsive to at least one of said character responsive means for detection of said character.

2. A device according to claim 1 wherein there are only three scanning means for each element, and wherein each two adjacent scanning means for each element are connected to a different one of said element responsive means.

3. A device according to claim 1 wherein each said element responsive means includes an AND-gate.

4. A device according to claim 1 wherein each said element responsive means includes a bistable trigger circuit.

5. A device according to claim 1 wherein said means responsive to said character responsive means includes an OR-gate.

6. A device according to claim 1 wherein each said character responsive means includes an AND-gate.

References Cited

UNITED STATES PATENTS

| | | | |
|---|---|---|---|
| 2,817,480 | 12/1957 | Baldwin | 340—146.3 |
| 3,106,699 | 10/1963 | Kamentsky | 340—172.5 |

DARYL W. COOK, *Primary Examiner.*

MAYNARD R. WILBUR, *Examiner.*

J. SCHNEIDER, J. E. SMITH, *Assistant Examiners.*

UNITED STATES PATENT OFFICE

CERTIFICATE OF CORRECTION

Patent No. 3,351,906 November 7, 1967

Hendrik Cornelis Anthony Van Duuren

It is hereby certified that error appears in the above numbered patent requiring correction and that the said Letters Patent should read as corrected below.

Column 1, lines 67 and 68, for "three coded element, but with the scanners shifted with respect the said elements" read -- three code elements, but with the scanners shifted with respect the said elements --; column 3, line 52, for "gate 12" read -- gate G 12 --; column 4, line 23, for "(a)" read -- (b) --.

Signed and sealed this 28th day of January 1969.

(SEAL)
Attest:

Edward M. Fletcher, Jr.
Attesting Officer

EDWARD J. BRENNER
Commissioner of Patents